(12) United States Patent
Jainek

(10) Patent No.: US 6,746,604 B2
(45) Date of Patent: Jun. 8, 2004

(54) LIQUID FILTER

(75) Inventor: Herbert Jainek, Heilbronn (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 36 days.

(21) Appl. No.: 09/865,283

(22) Filed: May 29, 2001

(65) Prior Publication Data

US 2002/0020661 A1 Feb. 21, 2002

(30) Foreign Application Priority Data

May 27, 2000 (DE) .......................... 100 26 451

(51) Int. Cl.7 ............................................. B01D 35/16
(52) U.S. Cl. ...................... 210/248; 210/435; 210/130; 210/453
(58) Field of Search ............................ 210/500.1, 435, 210/232, 248, 443, 450, 433.1, 440, 462, 418, 428; 261/DIG. 4

(56) References Cited

U.S. PATENT DOCUMENTS 5,098,559 A * 3/1992 Mack et al. ................ 210/130
5,688,396 A * 11/1997 Baumann et al. ........... 136/232
5,698,098 A * 12/1997 Ernst et al. ................. 210/248

FOREIGN PATENT DOCUMENTS

| EP | 0681094 | 11/1995 |
| GB | 2287199 | 9/1995 |
| WO | 97/28880 | 8/1997 |

* cited by examiner

Primary Examiner—W. L. Walker
Assistant Examiner—Krishnan S Menon
(74) Attorney, Agent, or Firm—Crowell & Moring LLP

(57) ABSTRACT

A liquid filter is described, which comprises a housing, a cover to seal said housing, a filter element arranged in said housing, and a supporting body for the filter element connected to the cover. The housing has an inflow opening for the liquid to be filtered as well as an outlet opening for the filtered liquid, and a drain opening for the liquid, which is sealed during normal operation of the filter element. For maintenance, this drain opening is opened so that all the liquid inside the housing can drain off. The drain opening is sealed by means of an element, which can be actuated by the supporting body for the filter element.

3 Claims, 2 Drawing Sheets

LIQUID FILTER

DESCRIPTION

Figure 1:
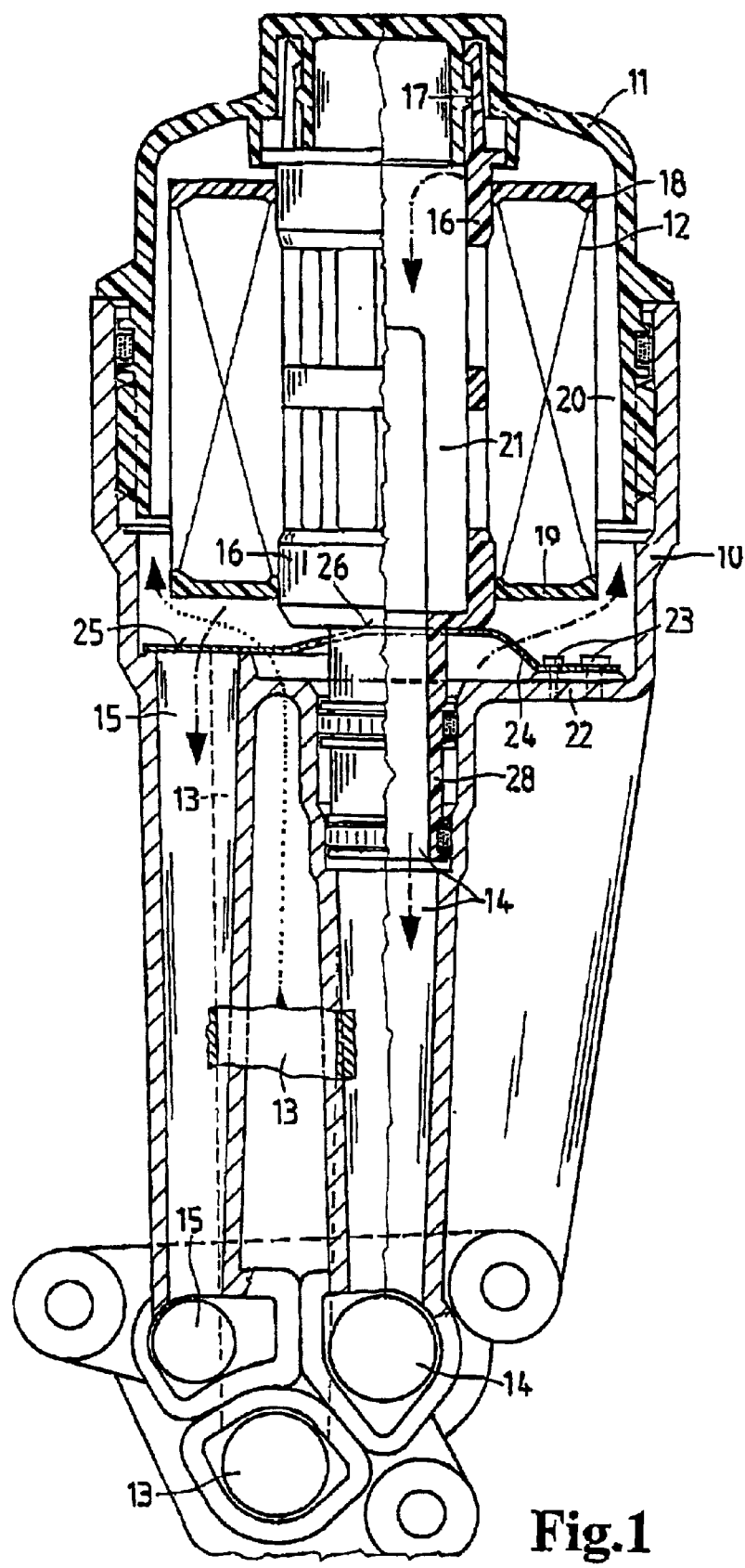

The invention relates to a liquid filter comprising a housing, a cover to seal said housing, a filter element arranged within said housing, and a supporting body connected to the cover to support the filter element.

PRIOR ART

German utility model DE GM 29 602 330 discloses a liquid filter. Such liquid filters are provided with a drain, which must be sealed during filter operation. In this known fluid filter a removable filter cartridge is provided. On the drain opening, a spring-loaded sealing element is arranged, which in its closed position is held by the filter cartridge against the spring action so as to seal the drain opening. When the filter cartridge is loosened or removed, this spring-loaded sealing element unblocks the drain opening. The sealing element consists, for instance, of a plate spring, which seals the opening either directly or via a gasket.

A drawback of this arrangement is that it does not ensure a reliable seal of the drain opening by the spring-loaded sealing element. It is well known that the employed filter cartridges have a certain tolerance with respect to their diameter or their length. Due to these tolerances, the force with which the filter cartridge presses the sealing element against the drain opening varies. Under some circumstances, if the tolerances of the filter element are very large, the drain opening may not be sealed even though the filter element is installed. As a result, oil or fluid may freely flow out of the drain opening during operation, so that effective filtering of the fluid is not ensured.

The object of the invention is to obviate said drawbacks and to create a liquid filter, which seals the drain opening during normal operation irrespective of tolerances and opens it during maintenance or when the filter element is being replaced. This object is attained by the features of the independent claim.

ADVANTAGES OF THE INVENTION

The essential advantage of the invention is that the drain opening for the liquid is not sealed or unsealed by the filter element itself as a functional element, but by the supporting body which is arranged in the cover of the liquid filter. Said supporting body has a defined length and is actuated via the movement of the cover. This makes it possible to define a precisely adjustable sealing force.

According to one embodiment of the invention, the element, which seals or opens the drain opening is a plate spring made of spring steel, which is fixed at one end and the free end of which seals the drain opening. As mentioned above, said plate spring is actuated by the supporting body. In one embodiment of the invention, this actuation is effected by a shoulder or a bead of the supporting body.

In an alternative embodiment, the supporting body itself is provided with a spring action element, which seals or opens the drain opening. Said spring action element can be a plate spring or a tappet.

According to a further development of the invention, the filter element of the liquid filter consists of a concentrically constructed zigzag-folded filter paper, which on its end faces is provided with end disks. This filter element can be pushed onto the supporting body. To replace the filter element, the cover is opened, the supporting body unblocks the drain opening via the spring element, and the oil or fluid inside the housing can drain off. After removal of the cover, the used filter element is pulled off the support tube, and a new filter element is pushed onto it. The cover is then closed again, and the support tube simultaneously seals the drain opening via the spring element, so that new fluid to be filtered can flow in.

These and other features of preferred further developments of the invention are set forth in the claims as well as in the description and the drawings. The individual features may be implemented either alone or in combination in the embodiment of the invention or in other fields of application and may represent advantageous embodiments that are protectable per se, for which protection is herewith claimed.

DRAWING

Figure 2:
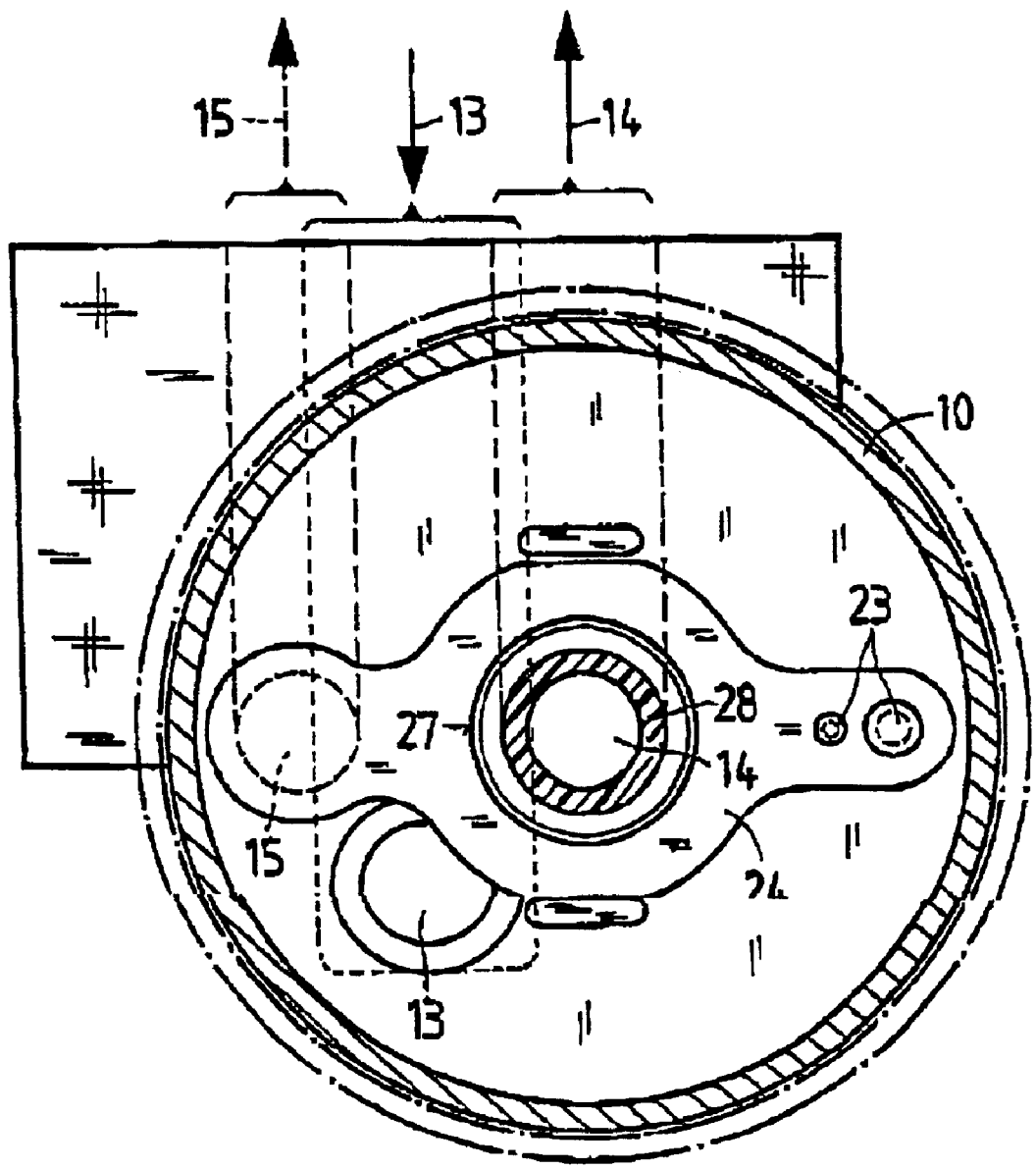

The invention will now be described by means of exemplary embodiments depicted in the drawing in which FIG. 1 is a section view of a liquid filter, and FIG. 2 is a top view onto the outlet or inflow openings.

DESCRIPTION OF THE EMBODIMENTS

FIG. 1 depicts a liquid filter with a housing 10, a cover 11 and a filter element 12 arranged in said housing. The housing has an inflow opening 13 for the unfiltered fluid, an outlet opening 14 for the filtered fluid, and a drain opening 15, which is opened when the filter element 12 is being replaced and which allows the oil inside the liquid filter to drain off.

A supporting body 16 is provided on cover 11. Said supporting body is firmly connected to cover 11 by means of a snap connection 17. The filter element 12, which is made of a zigzag-shaped folded filter paper and end disks 18, 19, is pushed onto the supporting body 16 and thus separates the unfiltered side 20 from the filtered side 21.

A spring element 24 is mounted to a floor area 22 of housing 10 via suitable fastening means 23. The spring element 24 seals the drain opening 15 in a simple manner in that it fits against the edge 25 of the floor. The sealing force is produced via the supporting body 16. In its lower area said supporting body is provided with a supporting edge 26 or a bead, which the spring element 24 contacts. When cover 11 is opened, it is lifted upwardly in axial direction. Due to the connection between cover 11 and supporting body 16, the supporting body is moved in upward direction and thus allows spring element 24 to relax, i.e., the spring element also moves upwardly and unblocks the drain opening 15, so that the oil inside the housing can drain off.

FIG. 2 is a top view onto the spring element 24, which is mounted to the floor of housing 10 with the aid of suitable fastening means 23. The spring element 24 is provided with an opening 27. The supporting body 16 together with the seal attachment 28 is pushed through this opening.

Drain 15 depicted here is arranged below spring element 24. FIG. 2 further shows an inflow opening 13 for the incoming oil, which is to be filtered.

What is claimed is:

1. Liquid filter comprising a housing, a cover to seal said housing, a filter element arranged in said housing, and a supporting body for the filter element connected to the cover, wherein the housing has an inflow opening for the liquid to be filtered, an outlet opening for the filtered liquid, and a drain opening for the liquid, which is sealed during normal operation of the filter element and is opened for maintenance or replacement of the filter element, wherein said drain opening is sealed with a plate spring made of spring steel, which is fixed at one end and the free end of which seals the drain opening, wherein the plate spring can be actuated by a shoulder or a bead of the supporting body for the filter element, wherein the fixed end of the plate spring is fixed to a floor of the housing with a fastening device, wherein the plate spring includes an opening, and wherein the supporting body extends through the opening of the plate spring and seals the one opening with a seal attachment when the plate spring is actuated by the supporting body.

2. Liquid filter as claimed in claim 1, characterized in that the supporting body has a spring action element, which seals or opens the drain opening.

3. Liquid filter as claimed in claim 1, characterized in that the filter element is a concentrically constructed element consisting of zigzag-folded filter paper, which at its end faces is provided with end disks and which can be pushed onto the supporting body.

* * * * *